United States Patent

Matzner

(10) Patent No.: US 7,549,681 B1
(45) Date of Patent: Jun. 23, 2009

(54) FLOWLINE CLAMP CONNECTOR

(75) Inventor: Mark D. Matzner, Burleson, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 591 days.

(21) Appl. No.: 11/414,984

(22) Filed: May 1, 2006

Related U.S. Application Data

(63) Continuation-in-part of application No. 11/013,486, filed on Dec. 16, 2004, now Pat. No. 7,204,525.

(60) Provisional application No. 60/566,264, filed on Apr. 29, 2004.

(51) Int. Cl.
  *F16L 17/00* (2006.01)
(52) U.S. Cl. .................... 285/367; 285/917; 285/373
(58) Field of Classification Search .............. 285/917, 285/367, 368, 373, 420, 364
See application file for complete search history.

(56) References Cited

U.S. PATENT DOCUMENTS

| | | | |
|---|---|---|---|
| 2,766,999 A | 10/1956 | Watts et al. | |
| 3,216,746 A * | 11/1965 | Watts | 285/110 |
| 3,403,931 A | 10/1968 | Crain et al. | |
| 3,554,581 A | 1/1971 | Mason et al. | |
| 3,680,188 A | 8/1972 | Mason et al. | |
| 4,218,080 A | 8/1980 | Kendrick | |
| 6,290,237 B1 | 9/2001 | Graupner | |
| 7,401,819 B2 * | 7/2008 | Gibb et al. | 285/373 |

OTHER PUBLICATIONS

Two-pages of Grayloc Products, Houston, Texas 77252 showing Grayloc Connectors in Extreme Service.
One page showing 4" Halliburton Big Inch Clamp Connection.

* cited by examiner

*Primary Examiner*—Aaron M Dunwoody
(74) *Attorney, Agent, or Firm*—Bracewell & Giuliani LLP

(57) ABSTRACT

A flowline connection assembly connects first and second tubular members to each other. Each tubular member has an external flange on its end. A recess is formed in the bore at the end of each of the tubular members. A seal ring extends into each of the conical recesses. A clamp with two halves, each with cam surfaces that engage the flanges and pull the tubular members axially toward each other. Bolts extend from one clamp half into the other. A retainer ring on each bolt retains the bolts with one of the clamp halves.

17 Claims, 3 Drawing Sheets

US 7,549,681 B1

FLOWLINE CLAMP CONNECTOR

CROSS-REFERENCE TO RELATED APPLICATION

This application is a continuation-in-part of Ser. No. 11/013,486, filed Dec. 16, 2004, now U.S. Pat. No. 7,204,525 which claims priority to provisional application Ser. No. 60/566,264, filed Apr. 29, 2004.

FIELD OF THE INVENTION

This invention relates in general to oilfield pipe connectors, and in particular to a clamp-type connector for connecting flowlines for well service operations.

BACKGROUND OF THE INVENTION

In some oil field service operations, such as hydraulic fracturing, cementing, acidizing and the like, high pressure fluids are pumped down the well. In some cases, the fluid pressures may be in excess of 15,000 psi. Typically, an operator brings high pressure pumping equipment to the well site and installs temporary service flowlines from the high pressure pumps to the wellhead. Because high volumes of fluid may also be needed, a number of pumping units may be connected together at one well site.

The temporary flowline components include joints or sections of steel pipe of differing lengths, various junctions, valves, swivels and the like. Generally, each well site differs, and the workers have to arrange the flowlines to extend around and past a variety of well site equipment. Many connections have to be made up, and each connection must be able to withstand the high pressure. The workers need to be able to quickly make and break out the connections to minimize the time for each job.

A hammer union is a common type of connector used for these temporary flowlines. The flowline components have ends that abut each other. A collar fits loosely on one end, the collar having internal threads for engaging threads on the end of the other flowline component. The collar has external lugs, and the workers deliver blows to the lugs to tighten the collars. While these hammer union systems work well, there are disadvantages. The larger size components can be fairly heavy, and the ends being joined have to be elevated above the ground to tighten the hammer union. A worker might sustain an injury while lifting the components and delivering blows with a hammer. In very cold climates, the hammer union could shatter or break due to the blows. Sparks can be created by delivering the blows, which could create an explosion if any combustible gas has leaked in the vicinity. The task of connecting the components with a hammer union is time consuming.

Another type of temporary oilfield service flowline uses clamps to clamp the ends of the flowlines together. The workers employ wrenches to secure four bolts that draw the clamp halves together. The clamp engages annular external flanges formed on the ends of the flowline components. A cylindrical seal recess is formed in the bore at the end of each flowline component. The cylindrical recess terminates in a shoulder that is parallel to the end face of the flowline component. A cylindrical metal carrier ring fits within but does not seal to the cylindrical seal recess. Rather a clearance exists between the recess and the carrier ring to facilitate entry of the carrier ring into the recess. Elastomeric seal rings are mounted to the carrier ring to seal against the cylindrical portions and shoulders of the recesses. This type of service flowline avoids the disadvantage of hammer union but is not in wide use.

In the clamp type of temporary flowline mentioned above, the external dimensions of the clamps are fairly large because the external flanges protrude considerably more than the outer diameter of the flowline component. Reducing the size would make setting up the flowlines more convenient because of compactness. However, the high pressure ratings mandate a certain amount of support metal and still must be maintained.

Another type of flowline connector uses clamps that secured the tubular members. In that type, the seal ring has conical surfaces that form metal-to-metal seals with conical surfaces formed in the passages of the tubular members. While able to sustain high pressures, these connectors are not normally used for oil field service work because the metal seals would not withstand daily make-up and break-out.

SUMMARY OF THE INVENTION

In this invention, each tubular member end portion has a flange that extends outward relative to a longitudinal axis. An annular recess is formed in the bore at the end of each of the tubular members. A seal ring has portions that extend into each recess for sealing the flow passages.

A clamp with two halves is used to clamp the tubular members to each other. Each clamp half has a flat end face, an external flange, and lugs extending outward from each side. A hole with a restricted diameter portion is formed in each lug of the first clamp half. A threaded bore is formed in each of the lugs of the second clamp half. A bolt is inserted into each of the holes in the first clamp half. A retainer ring is mounted on each bolt on the opposite side of the restricted diameter portion from the head of the bolt to retain each bolt with the first clamp half. The retainer ring and shoulder are spaced so that the bolt can be completely unscrewed without the retainer ring contacting the restricted diameter portion. This allows one bolt to be completely disengaged from the second clamp half. while the other bolt is still fully made up with the threaded bore in the second clamp half.

The external flanges are dimensioned to provide the necessary strength without having an excessively large diameter. In one embodiment, the ratio of the flange outer diameter over the axial thickness of the flange is from about 3.00 to about 7.10. Also, the outer diameter of the external flange over the inner diameter of the seal ring is about 1.50 to about 2.10.

DETAILED DESCRIPTION OF THE INVENTION

Figure 1:
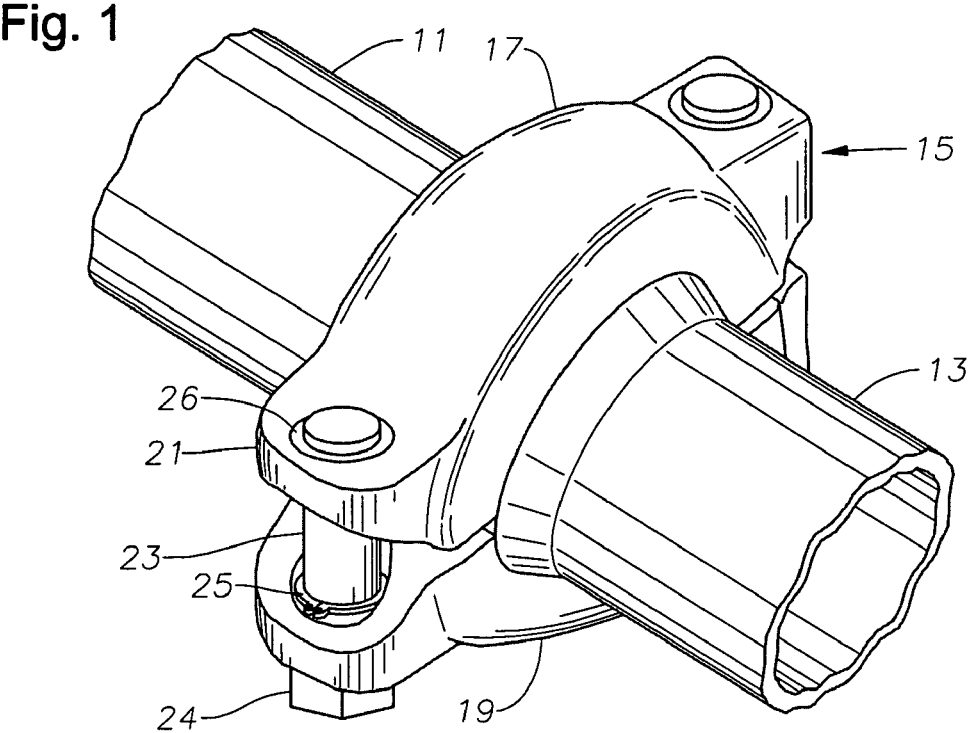
FIG. 1 is a perspective view illustrating a flowline clamp connector constructed in accordance with this invention.

Referring to FIG. 1, two tubular members 11, 13 are shown connected together by a clamp connector 15. Tubular members 11 are conduits that are normally utilized in oil and gas well service operations. In typical well service operations, the operator brings high capacity pumps to a well site to pump well fluids into the well for various purposes, such as cementing, fracing, acidizing and the like. A number of tubular members 11 are connected to each other to form temporary flowlines from the pumping equipment to the well. Tubular members 11 comprise lengths of straight pipe, tees, ells, adapters, valve ends and the like. The lengths of straight pipe typically range from a few feet to 20 feet, and inner diameters usually are from 2 inches to 4 inches. Connectors 15 allow tubular members 11 to be quickly made up and disassembled. Tubular members 11 must be able to sustain high pressures, in some cases 15,000 psi to 20,000 psi.

Connector 15 is a clamp assembly having two halves or semi-circular portions 17, 19. Each clamp portion 17, 19 has a lug 21 protruding from opposite sides, each lug 21 having a single hole 26. Preferably, holes 26 in lugs 21 in clamp portion 17 are threaded, while holes 26 in clamp portion 19 are not threaded. A fastener, such as a bolt 23, inserts through hole 26 in each lug 21 of clamp portion 19 and engages the threaded holes 26 in lugs 21 of clamp portion 17 to clamp tubular members 11 together. Bolts 23 have heads 24 that have drive surfaces for engagement by a tool, such as a socket of an air impact wrench. Preferably bolts 23 are retained with clamp portion 19 by retention devices, such as a retainer ring 25, such that when detached from clamp portion 17, each bolt 23 is loosely retained with clamp portion 19. Alternately, though not preferred, one bolt 23 could be retained with clamp half 17 and the other with clamp half 19. Another fasteners are feasible, such as bolts that are engaged by nuts.

Figure 2:
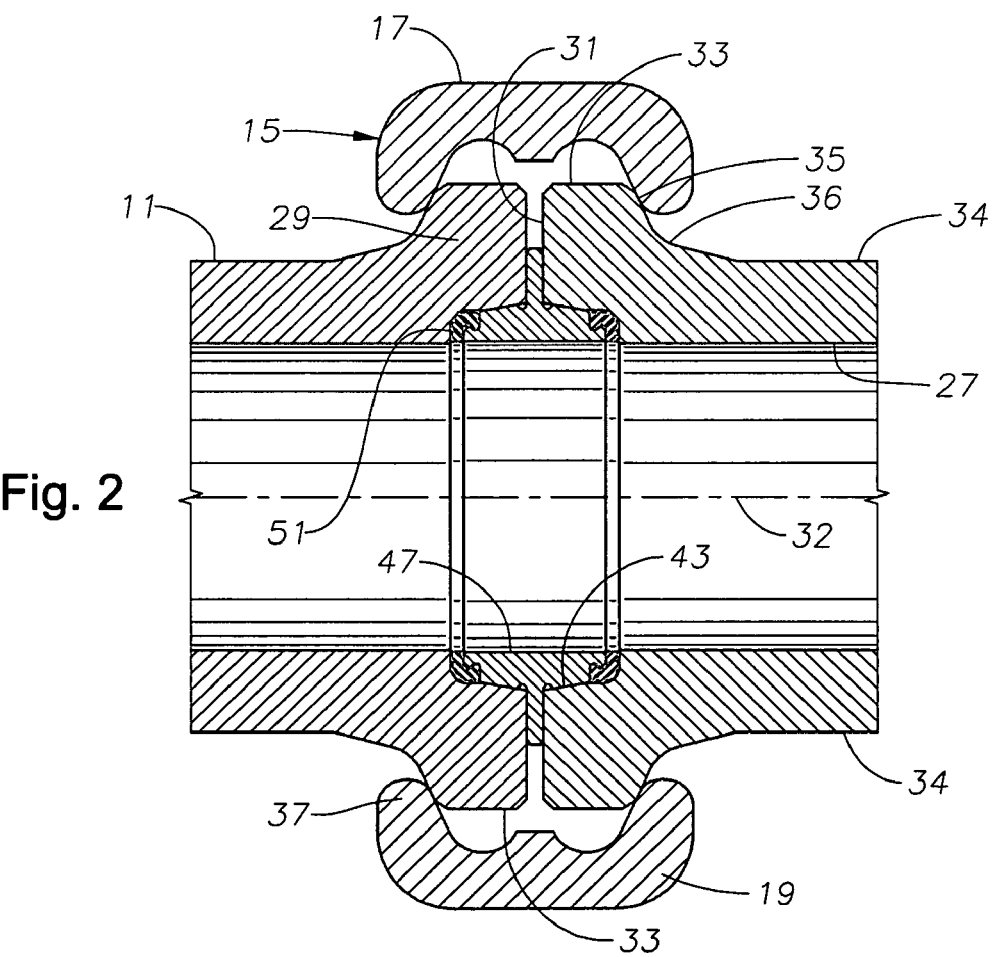
FIG. 2 is a sectional view of the clamp connector of FIG. 1.

Referring to FIG. 2, each tubular member 11 has a bore 27 that is coaxial with the bore of the tubular member to which it is connected. Each tubular member 11 has each end with an external annular flange 29. Tubular member 11 has a flat end face 31 that is perpendicular to longitudinal axis 32 of each tubular member 11. One end of flange 29 extends outward from end face 31. Faces 31 of the adjacent tubular members 11 are closely spaced but not contacting each other. Flange 29 has a cylindrical outer periphery 33 that is larger in diameter than outer periphery 34 of each tubular member 11. Flange 29 has a tapered shoulder 35 that extends from outer periphery 33 of flange 29 at a selected acute angle, about 25 degrees, relative to a plane perpendicular to axis 32. Shoulder 35 is a flat conical cam surface that appears straight when seen in cross-section. Shoulder 35 joins a curved fillet 36 that gradually blends to outer periphery 34 of tubular member 11.

Each clamp portion 17, 19 has a depending cam surface or wedge 37 that engages tapered shoulder 35 and tapers as the same angle as tapered shoulder 35. Drawing clamp portions 17, 19 toward each other with fasteners 23 causes flanges 29 to move axially toward each other. Outer periphery 33 of flanges 29 has a relatively small outer diameter compared to prior art type clamp connectors for the same tubular member size. In order to make up a loss in support metal due to a reduction in the outer diameter of periphery 33, flange 29 has an axial dimension 39, shown in FIG. 3, that is relatively large compared to prior art clamp connectors. Axial dimension 39 is measured from end face 31 to the junction between outer periphery 33 and tapered shoulder 35. The outer diameter of outer periphery 33 divided by the axial length 39 is preferably in the range from about 3.00 to 7.10.

Figure 3:
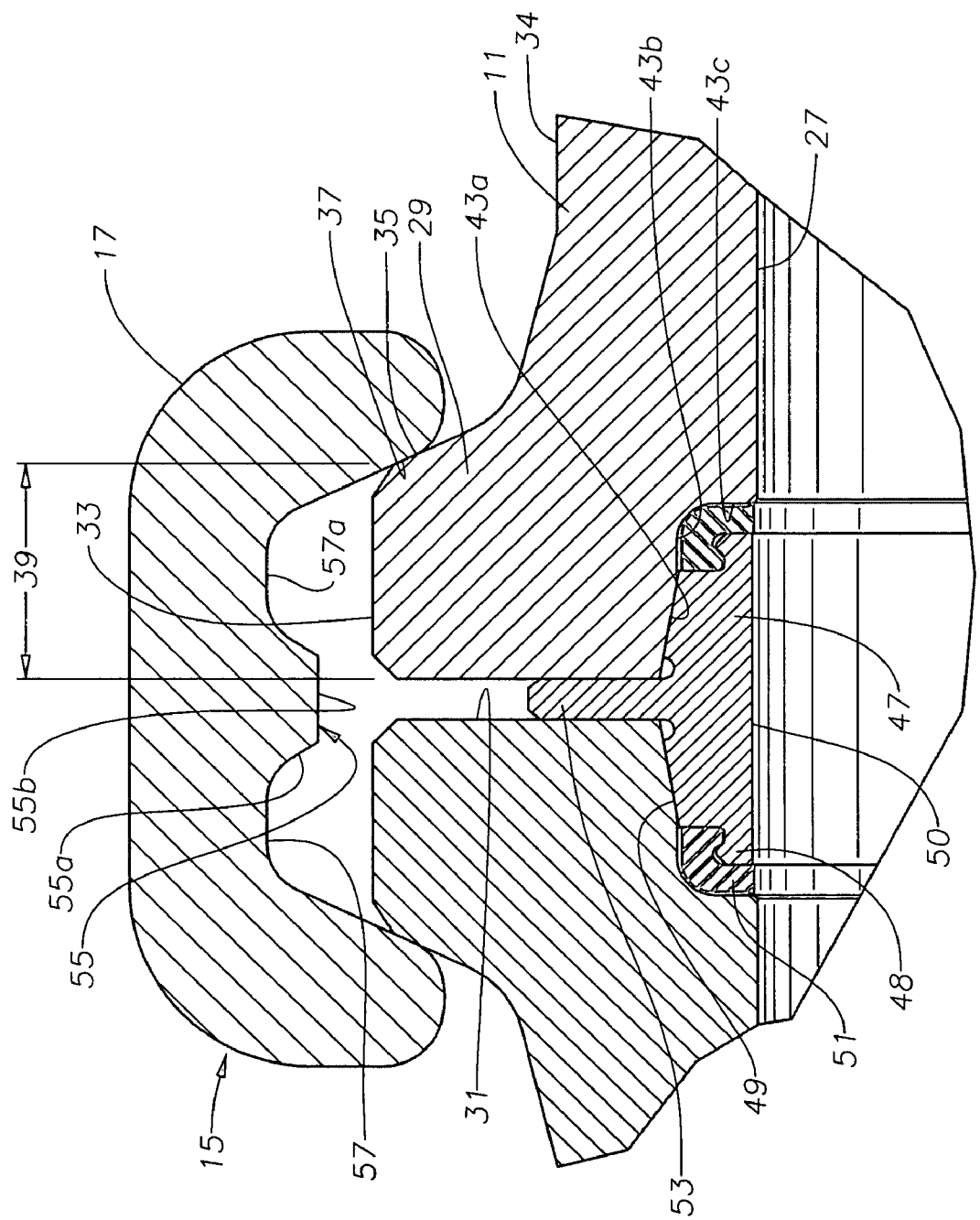
FIG. 3 is a further enlarged view of a portion of the clamp connector of FIG. 1.

Referring still to FIGS. 2 and 3, bore 27 has a counterbore or recess 43 formed at the intersection with end face 31. Recess 43 has a flat end or shoulder 43c that extends radially outward from bore 27 and joins a cylindrical portion 43b that is concentric with axis 32 (FIG. 2). A large radius or fillet is located at the junction of cylindrical portion 43b and shoulder 43c. A tapered or conical surface 43a joins cylindrical portion 43b and converges outward at a selected angle until reaching end face 31. When viewed in cross-section, tapered surface 43a is at an acute angle relative to axis 32 that is preferably between 8 and 12 degrees and 10 degrees in the preferred embodiment. The junction of conical portion 43a with cylindrical portion 43b is an obtuse angle, as shown in the drawings. Conical portion 43a has a longer axial length than cylindrical portion 43b. In this example, the distance from shoulder 43c to conical portion 43a is approximately 60 percent of the distance from end face 42 to cylindrical portion 43b.

A seal ring 47 locates within recesses 43 of two abutting tubular members 11. Seal ring 47 could be formed of metal or of a high strength resin composite material. Seal ring 47 has two legs 48, one of which locates in each of the adjoining recesses 43. Each leg 48 has an outer tapered surface 49 that engages one of the tapered surfaces 43b. Preferably, the engagement of tapered surfaces 43b, 49 is an interference fit that elastically deforms legs 48. tapered surface 49 is slightly larger in outer dimension that tapered surface 43b. Being an elastic deformation, seal ring 47 can be re-used. Seal ring 47 also has an inner diameter 50 that may be the same diameter as bore 27, as illustrated, but often is different.

The outer diameter of each flange 29 is fairly small relative to the inner diameter 50 of seal ring 47. Preferably, the ratio of the outer diameter of flange 29 to inner diameter 50 is in the range from about 1.50 to about 2.10.

In this example, seal ring 47 has a rib 53 that extends radially outward from a junction with legs 48, although a rib is not necessary. End faces 31 abut but do not seal against opposite sides of rib 53.

An elastomeric seal 51 is carried on an end of each leg 48. Each seal 51 is in the general shape of a "J" having one portion that is exposed to bore 27 and another portion that sealingly engages cylindrical recess portion 43b and shoulder 43c. Each seal 51 is trapped between recess portions 43b, 43c and seal ring 47, to form the primary seal for internal pressure in bore 27. In the preferred embodiment, the metal-to-metal engagement of tapered surfaces 43a and 49 forms a secondary seal, but the secondary sealing is optional because the purpose of the metal-to-metal contact is not to seal, rather it is to prevent high pressure causing elastomeric seal 51 to extrude between tapered surfaces 43a and 49. The rating of the secondary metal-to-metal seal is much lower than that of elastomeric seal 51, and the metal-to-metal sealing engagement would not provide the necessary sealing under high pressure in the event of failure of elastomeric seal 51.

Each clamp half 17, 19 has an internal rib 55 located equidistant between the two tapered wedge surfaces 37 for providing strength. Clamp rib 55 has a crest 55b, which defines its inner diameter, and tapered conical flanks 55a extending in opposite axial directions from crest 55b of rib 55. Crest 55b is a cylindrical surface in this embodiment, but it could be rounded. Clamp rib 55 has two converging flanks 55a that are flat conical surfaces, each of which joins a concave groove 57. Each groove 57 joins one of the wedges 37 and has a generally cylindrical base 57a. Base 57a could be rounded rather than cylindrical. Curved fillets join base 57a with the conical sides of rib flanks 55a and wedges 37.

Each groove 57 has a width or axial extent from the corner junction of rib crest 55b and rib flank 55a to flange 37, measured along a line parallel to the axis of bore 27. The width of groove 57 is greater than the width of crest 55b in this example. The width of crest 55b is only slightly greater than the width of seal rib 53 in this embodiment. Clamp rib 55 has a considerably smaller inner diameter than the inner diameters of groove bases 57a to reduce the outer diameter of clamp halves 15 and 17 and still provide the desired strength. Preferably the inner diameter of each groove base 57a is in the range from 10 to 20 percent greater than the inner diameter of rib crest 55b.

In operation, the operator abuts ends of tubular members 11 with seal ring 47 located between end faces 31. The operator places clamp halves 17, 19 around flanges 29 and tightens bolts 23 to draw clamp halves 17, 19 toward each other. The radial movement of clamp halves 17, 19 causes tubular members 11 to move axially toward each other and causes seals 51 to energize and seal against recess 43. The axial movement also causes a metal-to-metal engagement between tapered surfaces 43a and 49. Recess conical surfaces 43a are larger in diameter than the outer diameters of elastomeric seals 51, except near the junction with cylindrical portions 43b. Consequently, during make-up, seals 51 do not slide against much of conical surfaces 43a. Rather seals 51 only slide axially along a small portion of conical surfaces 43a, and cylindrical portions 43b have short axial lengths compared to conical portions 43a. Avoiding extensive axial sliding movement during make-up reduces the possibility of damage to seals 51.

Figure 4:
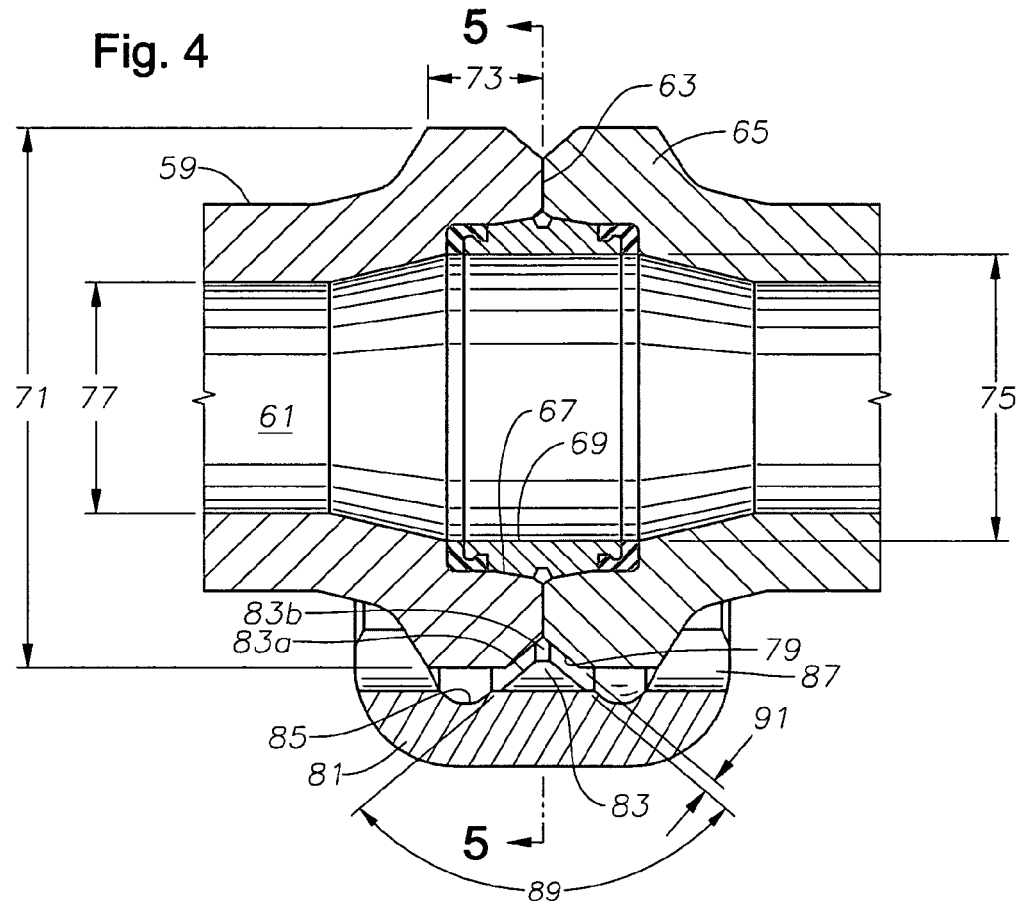
FIG. 4 is a sectional view of an alternate embodiment of the clamp connector of FIG. 1, with the upper half of the connector shown removed.
Figure 5:
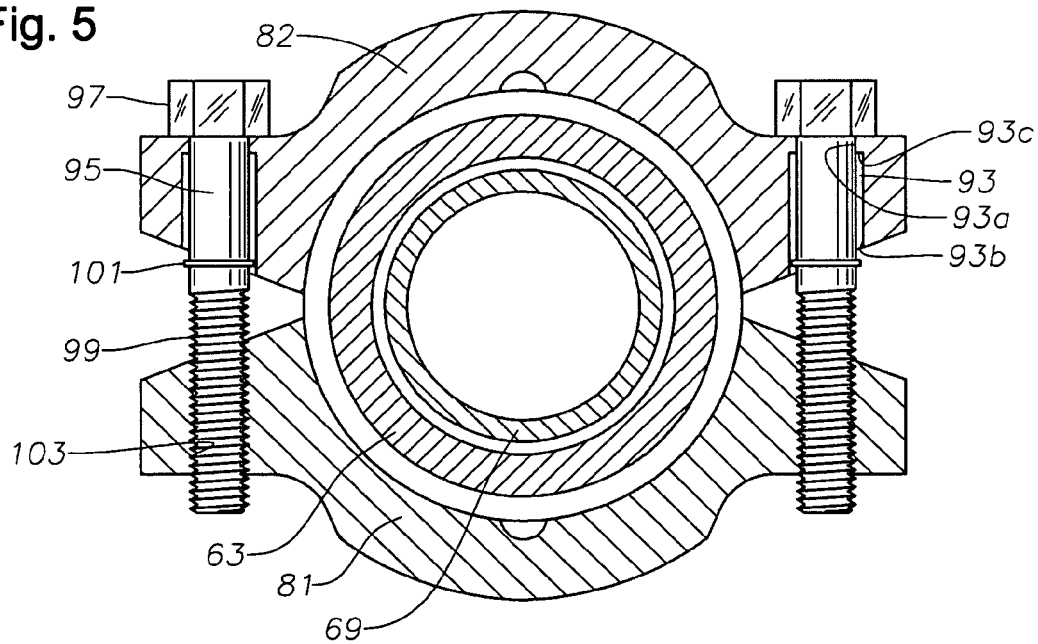
FIG. 5 is a sectional and perspective view of the clamp connector of FIG. 4, taken along the line 5-5 of FIG. 4 and showing the upper half of the connector.

FIGS. 4 and 5 illustrate an alternate embodiment for connecting tubular members 59 (FIG. 4) together. Each tubular member 59 has a flow passage 61 that terminates in a flat end face 63. An external flange 65 encircles end face 63. A recess or counterbore 67 extends inward in flow passage 61 from each end face 63.

A seal ring 69 has portions or legs sealingly engaging each counterbore 67 for sealing flow passages 61. Seal ring 69 is constructed generally as shown in the first embodiment, except it has no rib such as rib 53 of seal ring 47 (FIG. 3). Consequently, end faces 63 abut each other, but they do not seal against each other.

As in the first embodiment, flange 65 has a outer diameter 71 divided by its axial length or thickness that is in the range from about 3.00 to about 7.10. Also, preferably flange outer diameter 71 over seal ring 47 inner diameter 75 is preferably in the range from about 1.50 to about 2.10. Note that in this embodiment, inner diameter 75 of seal ring 47 is greater than inner diameter 77 of tubular member flow passage 77.

A chamfer of conical bevel 79 is formed on each tubular member flange 65 at the junction with end face 63. Because end faces 63 abut in this embodiment, chamfers 79 join each other when tubular members 59 are connected, creating an annular V-shaped recess.

Clamp halves 81 and 82 secured tubular members 59 to each other. Clamp half 82 is shown in FIG. 5 but not in FIG. 4. Each clamp half 81 has a prominent internal rib 83 that has conical, converging flanks 83a and a cylindrical crest 83b. A concave groove 85 extends between each flank 83a and a clamp wedge or cam surface 87. Preferably, the included angle 89 between rib flanks 83a is approximately the same as the included between chamfers 79. Chamfers 79 preferably incline approximately the same angle as rib flanks 83 and extend approximately the same axial length. This results in a clearance 91 between each rib flank 83a and each chamfer 79, when tubular members 59 are connected, that is substantially constant from groove 85 to rib crest 83b. The inner diameter of crest 83b is only slightly larger than outer diameter 71 of flange 65.

Referring to FIG. 5, a hole 93 is formed in each lug of clamp half 82. Hole 93 has a reduced or restricted diameter portion 93a and an enlarged diameter portion 93b. The intersection of portions 93a and 93b define an inward facing shoulder 93c. In this example restricted diameter portion 93a extends from shoulder 93c to the outer end of hole 93, although not necessary, and enlarged diameter portion 93b extends from shoulder 93c to the inner end of hole 93.

A bolt 97 inserts into each hole 93. Bolt 95 has a head 97 that has drive surfaces for receiving a wrench, preferably powered. Head 97 is larger in diameter than restricted diameter portion 93a and has a threaded section 99 that is smaller in diameter than restricted diameter portion 93a. A retainer ring 101, preferably a split, snap ring, is mounted to a shank portion of bolt 95 between head 97 and threaded section 99. Retainer ring 101 is smaller in outer diameter than enlarged diameter portion 93b and smaller in diameter than restricted diameter portion 93b. Retainer ring 101 and head 97 thus trap or retain bolt 97 with clamp half 81.

Threaded section 99 screws into a threaded bore 103 in each lug of clamp half 81. The length of enlarged diameter portion 93b and the position of retainer ring 101 are selected so that one bolt 95 can be completely unscrewed from its threaded bore 103 while the other bolt 95 remains fully made up. When fully made up, the distance from retainer ring 101 to shoulder 93c is slightly greater than the distance from the lowermost engaged thread on threaded section 99 to the uppermost engaged thread on threaded section 99. This dimensioning assures that retainer ring 101 will be spaced slightly from shoulder 93c when bolt 95 is fully unscrewed.

The invention has significant advantages. The use of clamp connectors rather than hammer unions reduces a possibility of accidents due to the use of hammers. The clamp connectors are more quickly and easily assembled than hammer unions. The retainers on the bolts prevent loss of bolts, which can have serious consequences on offshore oil and gas well platforms. The position of the retainers and the restricted diameter portions allow the operator to fully unscrew one bolt while the other remains fully made up. This feature reduces galling of the threads that might otherwise occur. The reduction in flange diameter and increase in flange axial length provides a compact connector without sacrificing strength. The prominent rib on the inner diameter of each clamp allows a reduction in outer diameter of the clamp half without a reduction in strength.

While the invention has been shown in only two of its forms, it should be apparent to those skilled in the art that it is not so limited but is susceptible to various changes without departing from the scope of the invention.

I claim:

1. A flowline connection assembly, comprising:

first and second tubular members, each having a flow passage and an end face encircled by a flange;

first and second clamp halves, each of the clamp halves having an a pair of cam surfaces that engage the flanges to pull the tubular members toward each other, and each of the clamp halves having a pair of lugs;

a hole extending through each of the lugs of the first clamp, each of the holes having a restricted diameter portion therein;

a pair of bolts, each extending through one of the holes of the first clamp half, each of the bolts having a head on one side of the restricted diameter portion of the hole and a threaded section on the other side of the restricted diameter portion, the head being larger in diameter than the restricted diameter portion, the threaded section being smaller in diameter than the restricted diameter section;

a retainer ring on each of the bolts between the threaded section and the restricted diameter portion, the retainer ring having an outer diameter larger than the restricted diameter portion and being located on a side of the restricted diameter portion opposite the head, each of the bolts being movable between an outer position, with the retainer ring in contact with the restricted diameter portion, and an inner position, with the head in contact with the lug; and a threaded bore extending through each of the lugs of the second clamp half for threaded engagement with the threaded section of each of the bolts.

2. The assembly according to claim 1, wherein while one of the bolts is in the inner position and fully in threaded engagement with one of the threaded bores, the other of the bolts may be moved to the outer position, fully disengaged from the other of the threaded bores.

3. The assembly according to claim 1, wherein each of the holes in the first clamp half has an enlarged counterbore that joins the restricted diameter portion, defining a shoulder facing inward.

4. The assembly according to claim 3, wherein the restricted diameter portion in each of the holes in the first clamp half comprises an inward-facing shoulder that is located closer to an outer end of the hole than an inner end of the hole.

5. The assembly according to claim 1, a distance from the inner position to the outer position is at least equal to a depth of the threaded bore.

6. The assembly according to claim 1, further comprising:
a chamfer formed at an intersection of each of the end faces with each of the flanges of each of the tubular members;
a rib formed in an inner side of each of the clamp halves parallel to and equidistant between the cam surfaces, the rib having inclined flanks that extend to a crest; and
when the tubular members are fully made up to each other, a clearance exists between each of the flanks and one of the chamfers, the clearance being substantially constant through the axial length of each of the flanks.

7. The assembly according to claim 1, further comprising:
a chamfer formed at an intersection of each of the end faces with each of the flanges of each of the tubular members;
a circumferentially extending rib formed in an inner side of each of the clamp halves equidistant between the cam surfaces, the rib having converging flanks; and
wherein an included angle between the flanks is substantially equal to an included angle between the chamfers when the tubular members are connected to each other.

8. The assembly according to claim 1, further comprising:
a rib formed in an inner side of each of the clamp halves parallel to and equidistant between each of the cam surface, the rib having flanks on opposite sides that converge toward each other and terminate in a crest;
a pair of concave recesses in each of the clamp halves, each of the recesses being located between one of the cam surfaces and one of the flanks of the rib; and wherein
the recesses of the clamp halves define a maximum inner diameter that is 10 to 20 percent greater than an inner diameter defined by the ribs of the clamp halves when the tubular members are connected.

9. The assembly according to claim 1, wherein an outer diameter of each of the flanges divided by an axial length of each of the flanges is in the range from about 3.00 to about 7.10.

10. The assembly according to claim 1, further comprising:
a passage extending through each of the tubular members, each of the passages having a counterbore at a junction with the end face;
a seal ring extending into each of the counterbores for sealing the passages between the two tubular members; and wherein an outer diameter of each of the flanges divided by an inner diameter of the seal ring is in the range from about 1.5 to about 2.10.

11. A flowline assembly comprising:
first and second tubular members having a common longitudinal axis when connected;
an end portion on each the tubular members having a flow passage terminating in a flat end face;
an external annular flange on each of the end portions, each of the flanges having a tapered surface axially spaced from the end face;
a counterbore formed in the passage of each end portion and extending axially from the end face;
a seal ring extending into each other counterbores when the tubular members are connected;
a pair of clamp halves, each having axially spaced apart internal cam surfaces that engage the tapered surfaces of the flanges on the end portions;
a fastener for securing the clamp halves to each other;
wherein when the tubular members are connected together,
each of the flanges has an outer diameter divided by an axial length that is in the range from about 3.00 to about 7.10; and
the outer diameter of the flanges divided by an inner diameter of the seal ring is about 1.50 to about 2.10.

12. The assembly according to claim 11, further comprising:
a chamfer formed at an intersection of each of the end faces with each of the flanges of each of the tubular members;
a circumferentially extending rib formed in an inner side of each of the clamp halves equidistant between the cam surfaces, the rib having converging flat flanks; and
wherein an included angle between the converging flanks is substantially equal to an included angle between the chamfers when the tubular members are connected to each other.

13. The assembly according to claim 11, further comprising:
a flat chamfer formed at an intersection of each of the end faces with each of the flanges of each of the tubular members;
a circumferentially extending rib formed in an inner side of each of the clamp halves equidistant between the cam surfaces, the rib having converging flat flanks; and
wherein each of the chamfers has substantially the same axial length as each of the flanks.

14. The assembly according to claim 11, further comprising:
a circumferentially extending rib formed in an inner side of each of the clamp halves equidistant between each of the cam surface, the rib having flanks on opposite sides that converge toward each other and terminate in a crest;
a pair of concave recesses in each of the clamp halves, each of the recesses being located between one of the cam surfaces and one of the flanks of the rib; and wherein
the recesses of the clamp halves define a maximum inner diameter that is 10 to 20 percent greater than an inner diameter defined by the ribs of the clamp halves when the tubular members are connected.

15. The assembly according to claim 11, wherein the inner diameter of the seal is greater than an inner diameter of each of the flow passages.

16. A flowline connection assembly, comprising:
first and second tubular members, each having a flow passage, a flat end face and an external flange, the flow passages having a common axis when the tubular members are connected together;

a counterbore extending from the end face into each flow passage;

a seal ring having a portion extending into each counterbore for sealing the passages;

the flanges having an outer diameter divided by an inner diameter of the seal ring that is in the range from about 1.50 to about 2.10;

first and second clamp halves, each of the clamp halves having an a pair of cam surfaces that engage the flanges to pull the tubular members toward each other, and each of the clamp halves having a pair of lugs;

an internal rib in each of the clamp halves, the rib being located equidistant between each of the cam surfaces and having tapered flanks separated from each of the cam surfaces by concave grooves;

a chamfer formed at an intersection of each of the flanges with each of the end faces, the flanks of the ribs being separated from the chamfers by substantially constant width clearances when the tubular members are connected to each other;

a hole extending through each of the lugs of the first clamp, each of the holes having an outer end, an inner end and an inward-facing shoulder therein;

a bolt inserted into each of the holes of the first clamp half, each of the bolts having a head and a threaded section;

a retainer ring on each of the bolts between the threaded section and the shoulder, the retainer ring having an outer diameter larger than an inner diameter of the shoulder to retain each of the bolts with the first clamp half;

a threaded bore extending through each of the lugs of the second clamp half for threaded engagement with the threaded section of each of the bolts; and the retainer rings and the shoulders being located to enable one of the bolts to be fully unscrewed from one of the threaded bores without the retainer ring contact the shoulder while the other of the bolts remains fully tightened in the other of the threaded bores.

17. The assembly according to claim 16, wherein the outer diameter of each of the flanges divided by an axial thickness of each of the flanges is in the range from about 3.00 to about 7.10.

* * * * *